(12) United States Patent
Buisson et al.

(10) Patent No.: US 10,081,475 B2
(45) Date of Patent: Sep. 25, 2018

(54) PACKAGING SYSTEM WITH AN OVERCAP

(75) Inventors: Gerard Laurent Buisson, Cincinnati, OH (US); Gene Michael Altonen, West Chester, OH (US)

(73) Assignee: THE FOLGER COFFEE COMPANY, Orrville, OH (US)

( * ) Notice: Subject to any disclaimer, the term of this patent is extended or adjusted under 35 U.S.C. 154(b) by 663 days.

(21) Appl. No.: 12/248,058

(22) Filed: Oct. 9, 2008

(65) Prior Publication Data
US 2009/0090721 A1 Apr. 9, 2009

Related U.S. Application Data

(60) Provisional application No. 60/998,091, filed on Oct. 9, 2007, provisional application No. 60/998,195, filed on Oct. 9, 2007.

(51) Int. Cl.
*B65D 53/00* (2006.01)
*B65D 79/00* (2006.01)
(Continued)

(52) U.S. Cl.
CPC ....... *B65D 79/005* (2013.01); *B65D 43/0212* (2013.01); *B65D 51/1683* (2013.01); *B65D 51/20* (2013.01); *B29C 45/1628* (2013.01); *B29C 45/1676* (2013.01); *B29L 2031/265* (2013.01); *B29L 2031/56* (2013.01); *B29L 2031/565* (2013.01); *B65D 2203/12* (2013.01); *B65D 2251/0018* (2013.01); *B65D 2251/0093* (2013.01); *B65D 2543/0062* (2013.01); *B65D 2543/00092* (2013.01); *B65D 2543/00231* (2013.01); *B65D 2543/00296* (2013.01); *B65D 2543/00351* (2013.01); *B65D 2543/00407* (2013.01); *B65D 2543/00537* (2013.01); *B65D 2543/00685* (2013.01);
(Continued)

(58) Field of Classification Search
CPC .............. B65D 43/0212; B65D 79/005; B65D 2251/0018; B65D 2251/0093
USPC ....... 215/303, 305, 341, 343–347, 352, 273, 215/274; 220/378, 614, 795, 803, 804, 220/806; 426/118, 127; 292/256.6
See application file for complete search history.

(56) References Cited

U.S. PATENT DOCUMENTS 682,995 A * 9/1901 Patterson ...................... 215/305
770,751 A * 9/1904 Hull ............................. 215/346
(Continued)

FOREIGN PATENT DOCUMENTS

EP 1767463 3/2007
JP 07-132954 5/1995
(Continued)

OTHER PUBLICATIONS

International Search Report for International Application No. PCT/IB2008/054143 dated Feb. 12, 2009.
(Continued)

*Primary Examiner* — Robert Poon
(74) *Attorney, Agent, or Firm* — Michael A. Olshavsky; Christopher L. Smith

(57) ABSTRACT

An overcap for a roast and ground coffee container is disclosed. The overcap can include a gasket as an airtight seal between the overcap and the container that preserves a clicking sound upon closure by an end user and an outer portion that gives an end user a visual and touchable stimulus.

12 Claims, 15 Drawing Sheets

(51) Int. Cl.
  *B65D 43/02* (2006.01)
  *B65D 51/16* (2006.01)
  *B65D 51/20* (2006.01)
  *B29C 45/16* (2006.01)
  *B29L 31/26* (2006.01)
  *B29L 31/56* (2006.01)

(52) U.S. Cl.
  CPC .............. *B65D 2543/00731* (2013.01); *B65D 2543/00796* (2013.01); *B65D 2543/00972* (2013.01)

(56) References Cited

U.S. PATENT DOCUMENTS

| | | | |
|---|---|---|---|
| 1,109,484 A * | 9/1914 | Taliaferro | 215/327 |
| 1,134,067 A * | 3/1915 | Hull | 215/327 |
| 1,242,510 A * | 10/1917 | Anderson | 215/305 |
| 1,413,257 A * | 4/1922 | Carvalho | 215/327 |
| 1,463,360 A * | 7/1923 | Foote | 277/641 |
| 1,488,567 A * | 4/1924 | Taliaferro | 215/317 |
| 1,625,963 A * | 4/1927 | Snyder | 215/262 |
| 1,671,903 A * | 5/1928 | Jaeger | 215/327 |
| 1,908,245 A * | 5/1933 | Hogg | 215/252 |
| 1,909,406 A * | 5/1933 | Holland | 215/352 |
| 2,074,830 A * | 3/1937 | Conner | 215/329 |
| 2,079,813 A * | 5/1937 | Podel | 53/488 |
| 2,238,105 A * | 4/1941 | Fison | 215/305 |
| 2,308,126 A * | 1/1943 | Stover et al. | 53/405 |
| 2,348,014 A * | 5/1944 | Mallard | 222/481 |
| 2,365,737 A * | 12/1944 | White | 215/346 |
| 2,394,135 A * | 2/1946 | Baar | 215/303 |
| 2,406,568 A * | 8/1946 | Sebell | 215/250 |
| 2,492,144 A * | 12/1949 | Gora | 215/345 |
| 2,670,868 A * | 3/1954 | Stover et al. | 215/46 |
| 2,700,186 A * | 1/1955 | Stover | 264/268 |
| 3,004,297 A * | 10/1961 | Stover | 264/163 |
| 3,004,298 A * | 10/1961 | Haynie | 29/527.4 |
| 3,067,899 A * | 12/1962 | Everett | 215/305 |
| 3,077,409 A | 2/1963 | Baselt | |
| 3,216,601 A * | 11/1965 | Wheaton | 215/346 |
| 3,269,141 A | 6/1966 | Weiss | |
| 3,286,868 A * | 11/1966 | Mumford | 215/295 |
| 3,305,119 A * | 2/1967 | Reynolds | 215/321 |
| 3,305,120 A * | 2/1967 | Owen | 215/345 |
| 3,360,153 A * | 12/1967 | Wheaton, Jr. | 220/4.21 |
| 3,490,139 A * | 1/1970 | McKinven, Jr. | 29/527.1 |
| 3,514,004 A | 5/1970 | Hammersmith | |
| 3,603,472 A * | 9/1971 | Lecinski et al. | 215/253 |
| 3,612,547 A * | 10/1971 | Kan | 277/563 |
| 3,664,544 A | 5/1972 | Hammes | |
| 3,687,334 A | 8/1972 | McNeil | |
| 3,731,834 A * | 5/1973 | Stuard | 220/270 |
| 3,746,199 A * | 7/1973 | Hart et al. | 215/256 |
| 3,812,992 A * | 5/1974 | Wolf et al. | 215/253 |
| 3,842,574 A * | 10/1974 | Dickey | 53/488 |
| 3,851,794 A * | 12/1974 | Hehl | 220/789 |
| 3,875,654 A * | 4/1975 | Ushijima | 29/527.1 |
| 3,892,351 A * | 7/1975 | Johnson et al. | 206/508 |
| 3,913,771 A * | 10/1975 | Acton | B65D 41/48 215/256 |
| 3,960,287 A * | 6/1976 | Baker | 215/253 |
| 3,973,719 A * | 8/1976 | Johnson et al. | 229/5.6 |
| 4,094,436 A * | 6/1978 | Birmingham | 220/315 |
| 4,206,499 A * | 6/1980 | Urbanek et al. | 362/546 |
| 4,223,800 A * | 9/1980 | Fishman | 220/801 |
| 4,227,618 A * | 10/1980 | Zipper | 215/253 |
| 4,301,941 A * | 11/1981 | Kraft | 220/780 |
| 4,363,420 A * | 12/1982 | Andrews | 220/787 |
| 4,373,317 A * | 2/1983 | Egli | 53/412 |
| 4,423,822 A * | 1/1984 | Powalowski | 215/365 |
| 4,489,844 A * | 12/1984 | Breskin | B65D 41/0442 215/329 |
| 4,511,053 A * | 4/1985 | Brandes et al. | 215/252 |
| 4,560,076 A * | 12/1985 | Boik | 215/252 |
| 4,562,936 A * | 1/1986 | Deflander | 220/268 |
| 4,588,105 A * | 5/1986 | Schmitz et al. | 220/787 |
| 4,607,757 A * | 8/1986 | Lecinski | 215/246 |
| 4,610,367 A * | 9/1986 | Massott et al. | 215/252 |
| 4,616,759 A * | 10/1986 | Mahler | 215/228 |
| 4,679,696 A * | 7/1987 | Bonnenfant et al. | 215/252 |
| 4,694,970 A * | 9/1987 | Hayes | B65D 41/3423 215/252 |
| 4,702,384 A * | 10/1987 | Weiser | 215/295 |
| 4,787,530 A * | 11/1988 | Edwards | 220/266 |
| 4,813,561 A * | 3/1989 | Ochs | B65D 41/3409 215/252 |
| 4,851,176 A * | 7/1989 | Christiansen et al. | 264/268 |
| 4,865,209 A * | 9/1989 | Bush | 215/216 |
| 4,978,016 A * | 12/1990 | Hayes | B29C 57/00 215/252 |
| 4,988,472 A * | 1/1991 | Orimoto et al. | 264/273 |
| 4,993,572 A * | 2/1991 | Ochs | B65D 51/145 215/260 |
| 5,035,798 A * | 7/1991 | Stenger | 210/232 |
| 5,190,177 A * | 3/1993 | Collins | 215/252 |
| 5,217,133 A * | 6/1993 | Timson et al. | 220/260 |
| 5,255,805 A * | 10/1993 | Weiss et al. | 215/274 |
| 5,356,026 A | 10/1994 | Andress et al. | |
| 5,395,003 A * | 3/1995 | Matsuda | 220/270 |
| 5,395,005 A * | 3/1995 | Yoshida | 220/359.2 |
| 5,443,172 A * | 8/1995 | Gabriele | 215/303 |
| 5,445,291 A * | 8/1995 | Daniel | 220/366.1 |
| 5,458,252 A | 10/1995 | Logel | |
| 5,540,344 A * | 7/1996 | Rosenthal et al. | 215/250 |
| 5,685,443 A * | 11/1997 | Taber et al. | 215/252 |
| 5,791,506 A * | 8/1998 | Sheffler et al. | 215/345 |
| 5,839,881 A * | 11/1998 | Yu | 416/5 |
| 5,868,273 A * | 2/1999 | Daenen et al. | 220/795 |
| 5,911,334 A * | 6/1999 | Helms | 220/359.4 |
| 5,992,660 A * | 11/1999 | Miura et al. | 215/247 |
| 6,053,353 A * | 4/2000 | Helms | 220/796 |
| 6,142,325 A * | 11/2000 | Chomik | 215/343 |
| 6,196,451 B1 * | 3/2001 | Helms | 229/125.13 |
| 6,364,152 B1 | 4/2002 | Poslinski et al. | |
| 6,371,319 B2 * | 4/2002 | Yeaton et al. | 215/352 |
| 6,460,720 B1 * | 10/2002 | Massey et al. | 220/359.1 |
| 6,481,589 B2 * | 11/2002 | Blomdahl et al. | 215/303 |
| 6,523,713 B1 * | 2/2003 | Helms | 220/831 |
| 6,581,939 B1 * | 6/2003 | Theros et al. | 277/394 |
| 6,662,958 B2 * | 12/2003 | German et al. | 215/252 |
| 6,691,468 B2 * | 2/2004 | Helferty | 49/463 |
| 6,974,046 B2 * | 12/2005 | Shenkar | 215/252 |
| 7,007,817 B2 * | 3/2006 | Jochem | 215/305 |
| 7,010,885 B2 * | 3/2006 | Helferty | 49/463 |
| 7,083,058 B2 * | 8/2006 | Perry et al. | 215/228 |
| 7,097,790 B2 * | 8/2006 | Jochem | 264/40.4 |
| 7,134,565 B1 * | 11/2006 | Wan et al. | 215/276 |
| 7,169,418 B2 * | 1/2007 | Dalton | B65D 21/0217 220/366.1 |
| 7,169,419 B2 * | 1/2007 | Dalton et al. | 426/110 |
| 7,175,039 B2 * | 2/2007 | German et al. | 215/252 |
| 7,390,043 B2 * | 6/2008 | Kraus | 296/1.06 |
| 7,455,192 B2 * | 11/2008 | Siragusa | 220/789 |
| 7,527,161 B2 * | 5/2009 | Rodriguez et al. | 215/252 |
| 7,766,178 B2 * | 8/2010 | Robinson et al. | 215/349 |
| 7,784,629 B2 * | 8/2010 | German et al. | 215/276 |
| 7,815,061 B1 * | 10/2010 | Robinson et al. | 215/220 |
| 7,946,438 B2 * | 5/2011 | Dobbelstein et al. | 215/252 |
| 7,997,437 B2 * | 8/2011 | Jatzke et al. | 220/359.4 |
| 8,109,396 B1 * | 2/2012 | Robinson et al. | 215/220 |
| 8,218,296 B2 * | 7/2012 | Rupp | 361/679.01 |
| 8,596,477 B2 * | 12/2013 | Kras et al. | 215/276 |
| 2001/0002012 A1 * | 5/2001 | Yeaton et al. | 215/44 |
| 2002/0113032 A1 | 8/2002 | Blomdahl et al. | |
| 2003/0010787 A1 * | 1/2003 | Dalton et al. | 220/912 |
| 2003/0093955 A1 * | 5/2003 | Helferty | 49/463 |
| 2003/0102251 A1 * | 6/2003 | Ryall et al. | 215/252 |
| 2004/0011759 A1 * | 1/2004 | Hahn et al. | 215/305 |
| 2004/0137110 A1 * | 7/2004 | Dalton et al. | 426/35 |
| 2004/0139660 A1 * | 7/2004 | Helferty | 49/465 |
| 2005/0061766 A1 * | 3/2005 | Jochem | 215/305 |
| 2005/0061812 A1 | 3/2005 | Vilalta et al. | |
| 2005/0062183 A1 * | 3/2005 | Jochem | 264/40.4 |

(56) References Cited

U.S. PATENT DOCUMENTS

| | | | |
|---|---|---|---|
| 2005/0145593 A1* | 7/2005 | Simone et al. | 215/295 |
| 2006/0091144 A1* | 5/2006 | Siragusa | 220/789 |
| 2006/0102631 A1* | 5/2006 | Kraus | 220/304 |
| 2006/0113272 A1* | 6/2006 | Rodriguez et al. | 215/252 |
| 2007/0068892 A1* | 3/2007 | Kaufman | 215/305 |
| 2007/0108155 A1* | 5/2007 | German et al. | 215/276 |
| 2007/0187352 A1* | 8/2007 | Kras et al. | 215/276 |
| 2007/0289936 A1* | 12/2007 | Pugne | 215/237 |
| 2008/0073312 A1* | 3/2008 | Babcock et al. | 215/305 |
| 2008/0105641 A1* | 5/2008 | Dobbelstein et al. | 215/253 |
| 2009/0109607 A1* | 4/2009 | Rupp | 361/679.01 |
| 2009/0110777 A1* | 4/2009 | Buisson | 426/87 |
| 2009/0218351 A1* | 9/2009 | Antal, Sr. | B65D 51/18 220/367.1 |
| 2009/0232947 A1* | 9/2009 | Buisson et al. | 426/118 |
| 2010/0200583 A1 | 8/2010 | Bergman et al. | |

FOREIGN PATENT DOCUMENTS

| | | |
|---|---|---|
| JP | 2000-153881 A | 6/2000 |
| JP | 3070008 B2 | 7/2000 |
| JP | 2000-226058 | 8/2000 |
| JP | 2001-315825 | 11/2001 |
| JP | 2004-528244 | 9/2004 |
| JP | 2004-529039 | 9/2004 |
| WO | 2009047725 | 4/2009 |

OTHER PUBLICATIONS

Written Opinion for International Application No. PCT/IB2008/054143 dated Feb. 12, 2009.
International Search Report for International Application No. PCT/IB2008/054142 dated Sep. 10, 2009.
Written Opinion for International Application No. PCT/IB2008/054142 dated Sep. 10, 2009.
Chinese Office Action from Chinese Patent Application No. 200880111618.8, dated Nov. 2, 2012.
Response to Office Action for U.S. Appl. No. 12/248,061, filed Mar. 20, 2013.
JP307008B2 machine translation from Japanese Patent Office.
Office Action from European Patent Application No. 08847744.5 dated Oct. 6, 2011.
Office Action from European Patent Application No. 08637101.8 dated May 20, 2010.
Response to Office Action from European Patent Application No. 08837744.5 dated Feb. 13, 2012.
Response to Office Action from European Patent Application No. 08837101.8 dated Jun. 15, 2010.
Request for Continued Examination from U.S. Appl. No. 12/248,061, filed May 5, 2012.
English translation of Notification of Second Examination Review from Chinese Patent Application No. 2008801116188, dated Feb. 29, 2012.
Response to First Office Action dated Mar. 22, 2011 from Chinese Patent Application No. 20880111618, dated Sep. 28, 2011.
Office Action from Chinese Patent Application No. 20880111618, dated Mar. 22, 2011.
Notification of Grant from European Patent Application No. 08 837 744.5-1261, dated Mar. 2, 2012.
Notice of Allowance from U.S. Appl. No. 12/248,061, dated May 3, 2012.
Statement of Opinion from Chinese Patent Application Serial No. 2000880120944.5. dated Oct. 17, 2011.
Submission (English translation not available) and the English claims to the First Office from Chinese Patent Application No. 20088120944.5, Oct. 17, 2011.
Text of First Office Action from Chinese Patent Application No. 200880120944.5, dated Apr. 2, 2011.
Notice of Grant from European Patent Application No. 06 837 101.1261, dated Apr. 17, 2012.
Response to Office Action dated Oct. 5, 2011 from European Patent Application No. 08 837 101.6-1261, dated Mar. 13, 2012.
Communication pursuant to Articles 94(3) from European Patent Application No. 08 837 101.801261 dated Oct. 5, 2011.
Response to Office Action dated Feb. 16, 2011 from U.S. Appl. No. 12/248,061 dated Aug. 16, 2011.
Office Action dated Feb. 16, 2011 from U.S. Appl. No. 12/248,06.
Office Action from U.S. Appl. No. 12/248,061, dated Sep. 20, 2012.
Official Notice of Rejection from Japanese Patent Application No. 2010-528517, dated Aug. 13, 2013; 2 pages.
Official Response (Amendment & Argument) to the Notice of Rejection filed with the Japanese Patent Office dated Nov. 12, 2013; 11 pages.
NonFinal Office Action U.S. Appl. No. 12/248,061, dated Nov. 6, 2014.
Response to NonFinal Office Action U.S. Appl. No. 12/248,061 filed on May 6, 2015.
Japanese Office Action from JP Appln. No. 2010-528516, dated Dec. 25, 2012.
Japanese Office Action from JP Appln. No. 2010-528517, dated Jan. 22, 2013.

* cited by examiner

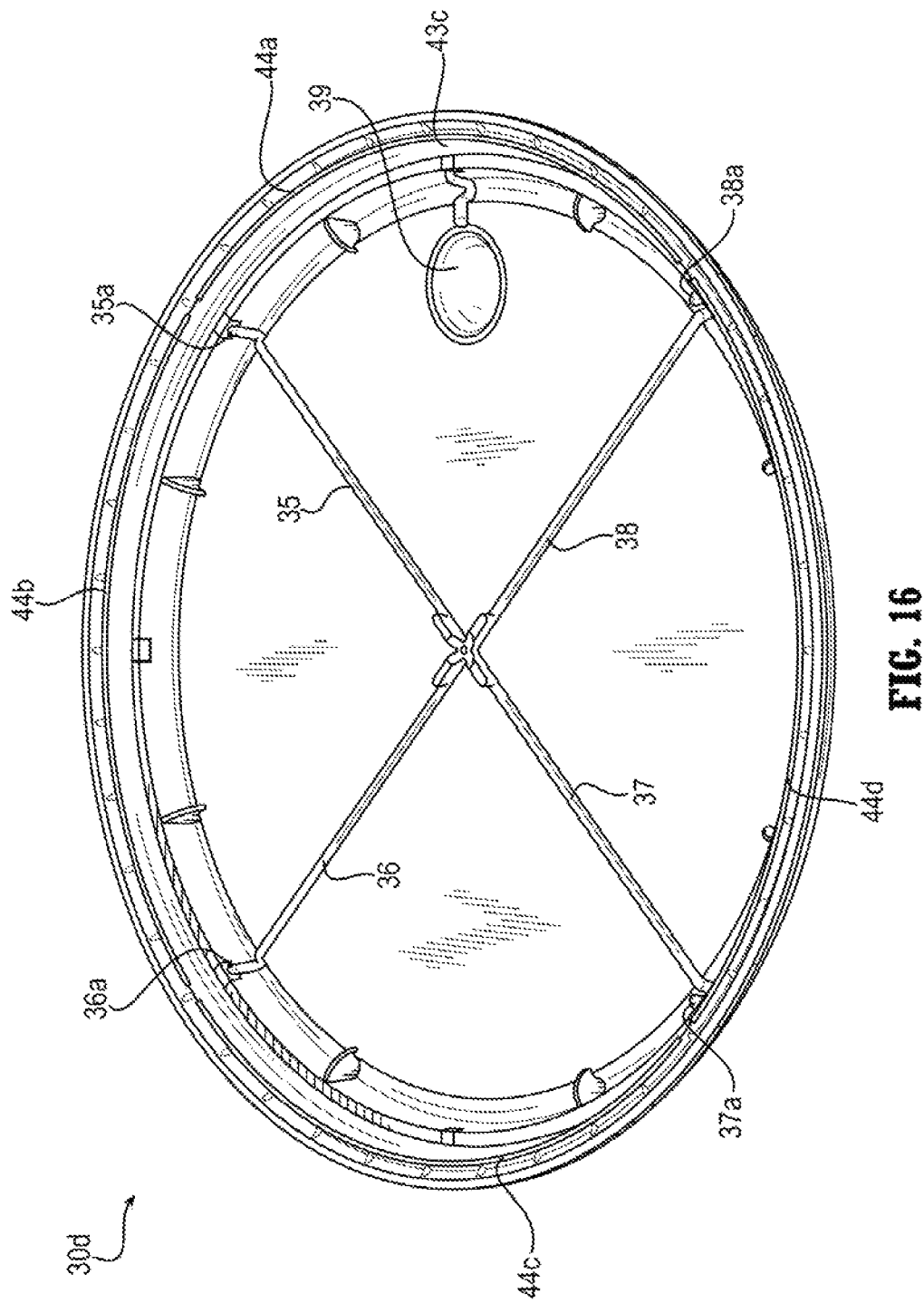

PACKAGING SYSTEM WITH AN OVERCAP

CROSS REFERENCE TO RELATED APPLICATIONS

This application claims priority to and the benefit of U.S. Provisional applications 60/998,091, filed on Oct. 9, 2007, and 60/998,195, filed on Oct. 9, 2007, both of which are hereby incorporated by reference herein in their entireties.

STATEMENT REGARDING FEDERALLY SPONSORED RESEARCH OR DEVELOPMENT

Not applicable.

INCORPORATION BY REFERENCE OF MATERIAL SUBMITTED ON A COMPACT DISC

Not Applicable.

BACKGROUND OF THE INVENTION

1. Field of the Invention

The present invention generally relates to a packaging system useful for packing food products and more particularly relates to a roast and ground coffee packaging system having a gasket as an airtight seal between the overcap and the container that preserves a clicking sound upon closure by an end user and an outer portion that gives an end user a visual and touchable stimulus.

2. Description of Related Art

Consumers generally want the appearance that food products, in particular roast and ground coffee, are fresh upon consuming. Packaging systems such as coffee containers, and in more particular plastic coffee containers such as those described in U.S. Pat. No. 7,169,418, assigned to The Procter & Gamble Company, are being used more and more to deliver coffee to consumers. With the increase of coffee sold to consumers in plastic containers, a consumer demand exists for indications that the coffee inside the container remains fresh. Consumers are aware that external environmental factors, such as air, including oxygen, affect the freshness and thus the taste of the roast and ground coffee. Current containers do not present these visual indicators to consumers to communicate to them that the container is providing not only a way to transport the roast and ground coffee but an indication that the roast and ground coffee is protected from these environmental factors.

Further, it is known from consumer research that freshness is a critical consumer need in the coffee marketplace. In other words, fresh coffee equates to a great tasting cup of coffee. Currently, methods are used to process and pack coffee to ensure that the coffee is still fresh by the time the consumer buys it at a store. Once the coffee is purchased and taken to the place of storage and consumption, typically a consumer's home, the consumer still desires for the coffee to stay fresh in the container over the length of time that it takes to consume the entire amount of coffee. Unfortunately, the fit between the overcap and the container has not been tight enough to effectively "seal in" freshness by way of an airtight seal or even to "burp" the package, i.e. to push on the top of the overcap to force air out of the container and then sealing the overcap to the container so that a slight vacuum is maintained over time, indicating that no air is coming into the container. Even if the fit had been tight enough, it would have been difficult for the consumer to see the depressed overcap (due to the pressure differential, i.e. vacuum) because the pressure differential was small, and the surface area of the cap was large, thus resulting in a small deflection of the overcap.

Even more so, airtight containers are comprised of a soft, usually thermoplastic, seal or gasket for sealing. Having this soft seal provides a generally airtight seal. However, using a soft thermoplastic for the seal results in loss of a clicking sound that occurs when an end user "burps" a container. During "burping" of a container, the lid, when constructed of a rigid plastic material, "clicks" when it is snapped onto the container and becomes fully attached to the container. However, when using a soft, thermoplastic seal on the container, the clicking sound is lost, resulting in the end user being unsure whether they have truly tightly closed and sealed the container. Thus, a need exists for a container that has an airtight seal but preserves the clicking sound when "burping" of the container is desired by the end user.

Emphasizing this problem is the use of visual indicators, in the form of vacuum-indicating buttons or bubbles. These bubbles generally operate when a pressure difference exists between the inside of the container and the outside of the container, which results when an end user "burps" the container. The bubble transforms from concave outwardly to concave inwardly to indicate that a partial vacuum exists inside the container. In order for the bubble to operate properly, at desired pressures, the soft, thermoplastic material is needed to form the airtight seal between the lid and the container. However, as above, the clicking sound needs to be preserved to assure the end user and provide confidence to them that the container has been completely sealed.

Thus, a need exists for a packaging system having an airtight seal that preserves a clicking sound upon closure by an end user. Further, it is desired to give the end user a visual and touchable stimulus by way of an outer portion.

BRIEF SUMMARY OF THE INVENTION

To address the current needs, the present invention contemplates a packing system for roast and ground coffee.

In one embodiment, a packaging system comprising a container, a flexible overcap for attaching to the container is disclosed. The flexible overcap can include a gasket for sealing the overcap and the container. The gasket can comprise a first surface for sealing to the container and a second surface for adhering to the overcap. The packaging system can further comprise an outer portion adhered to the perimeter of the overcap. The outer portion can comprise a first portion for adhering to the overcap and a second portion for visual and touching stimulus to an end user. The flexible overcap can comprise a middle portion positioned to separate the gasket and the outer portion such that the gasket and the outer portion do not contact one another and wherein the middle portion physically contacts the container when the overcap is attached to the container. An audible sound can be produced by the physical contacting of the middle portion and the container and can be capable of being perceived by a person when the overcap is applied to the container. Multiple color arrangements are also envisioned.

In another embodiment, an overcap for sealing a container is disclosed. The overcap can comprise a collar, a gasket for sealing between the collar and the container, the gasket comprising a first surface for sealing to the container and a second surface for adhering to the collar, and an outer portion adhered to the collar, the outer portion comprising a first portion for adhering to the collar and a second portion for visual and touching stimulus to an end user. The overcap can further comprise the collar having a middle portion wherein the middle portion is positioned to separate the gasket and the outer portion such that the gasket and the outer portion do not physically contact one another; and wherein the middle portion physically contacts the container when the overcap is attached to the container.

Yet another embodiment includes a packaging system comprising a container comprising an open top, a closed bottom, and a body portion; a flexible overcap for attaching to the container, wherein the flexible overcap includes a gasket for sealing the overcap to the container, and wherein the flexible overcap includes a middle portion positioned to separate the gasket and the outer portion such that the gasket and the outer portion do not contact one another and wherein the middle portion physically contacts the container when the overcap is attached to the container; an outer portion adhered to the perimeter of the overcap, wherein the outer portion comprises a second portion viewable and touchable by an end user; and wherein an audible sound is produced by the physical contacting of the middle portion and the container, the audible sound capable of being perceived by a person when the overcap is applied to the container.

Numerous advantages and additional aspects of the present invention will be apparent from the description of the preferred embodiments and drawings that follow.

BRIEF DESCRIPTION OF THE DRAWINGS

While this specification includes a description of the present invention and concludes with claims that define the invention, it is believed that both will be better understood by reference to the drawings wherein:

FIG. 16 is a perspective view of a second embodiment of the underside of the overcap.

DETAILED DESCRIPTION OF THE INVENTION

Figure 1:
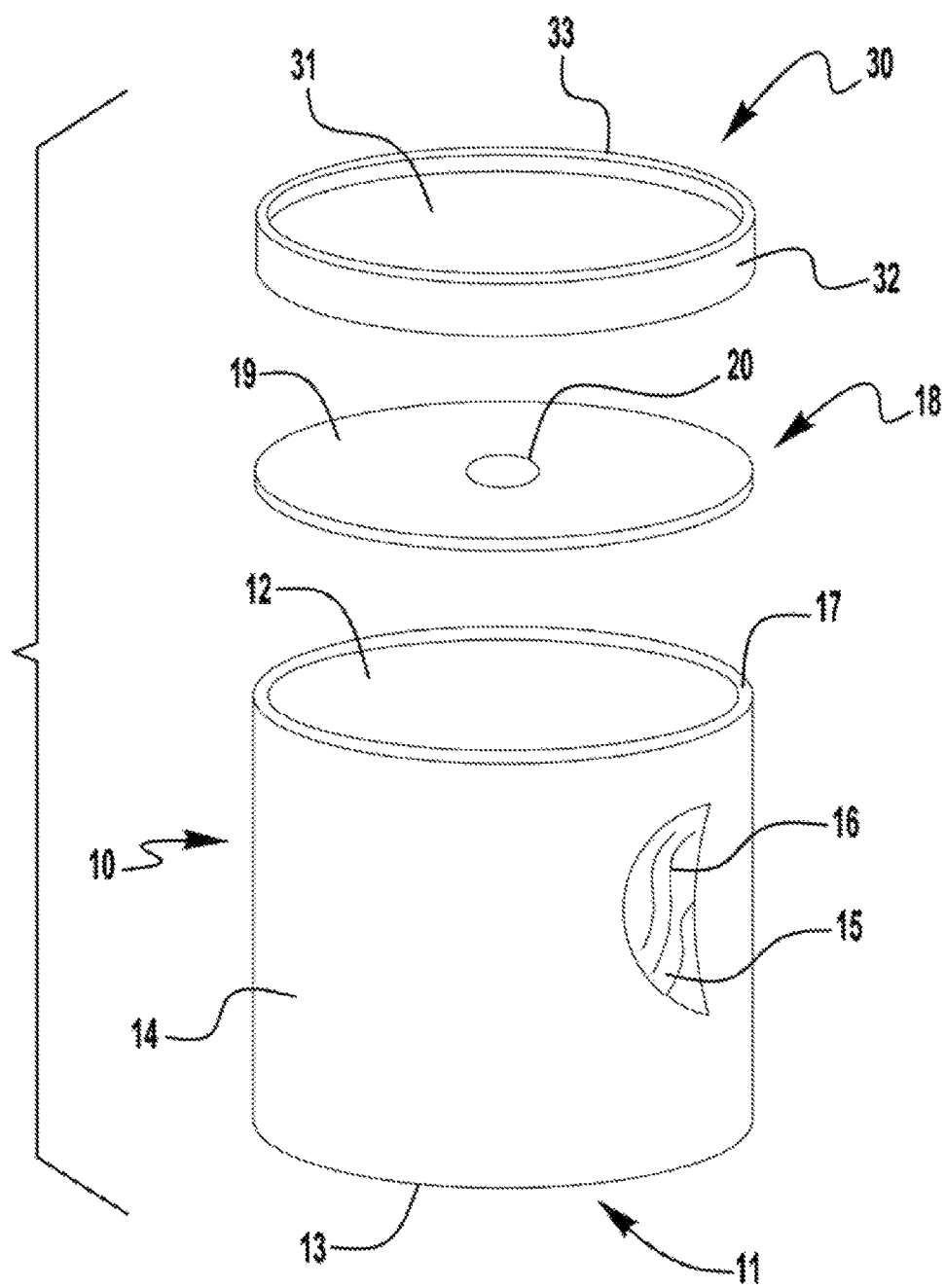
FIG. 1 is an exploded perspective view of a packaging system.

For the purpose of promoting an understanding of the principles of the invention, reference will now be made to the embodiments illustrated in the drawings and specific language will be used to describe the same. It will nevertheless be understood that no limitation of the scope of the invention is thereby intended. Such alterations and further modifications in the illustrated device and such further applications of the principles of the invention as illustrated therein as would normally occur to one skilled in the art to which the invention relates are contemplated as within the scope of the invention.

Although the invention herein will generally be described in terms of a package for a food product, it should be understood that any suitable packaging system for a food product is within the scope of the present invention. A double shot molding of thermoplastic elastomer as used and described herein may be useful and advantageous for any product where it is valuable, or at least desirable, for a packaging system to have an airtight seal that preserves a clicking sound upon closure by an end user.

As used herein, the articles including "the", "a" and "an" when used in a claim or in the specification, are understood to mean one or more of what is claimed or described.

As used herein, the terms "include", "includes" and "including" are meant to be non-limiting.

As used herein the term "burp" or "burping" of the packaging system is defined as when an end user or consumer pushes on the top of an overcap of a packaging system in accordance with one embodiment of the present invention to force air out of a container and then subsequent sealing or attaching of the overcap to the container so that a slight vacuum is created within the packaging system. Thus, "burping" results in excess atmospheric gas being discharged from the container and thereby reduces the amount of air, and thus oxygen, present inside the container.

As used herein the term "clicking" or "snapping" means to create an audible sound that is capable of being perceived, and can be perceived, by a consumer during the ordinary and customary application of an overcap to a container.

The present invention is related to a packaging system for roast and ground coffee. The packaging system can comprise a container, an overcap, a gasket for sealing between the overcap and the container, and an outer portion adhered to the perimeter of the overcap. The overcap can generally be made of a polyolefin material so that during "burping" of the packaging system by an end user, the overcap snaps into place with a snapping, or clicking, sound. Polyolefins include any linear low density polyethylene or polypropylene, or their functional equivalents that can be used to preserve the snapping sound of the overcap. This snapping sound verifies to the end user that a tight seal has been created. The gasket can generally be made of a thermoplastic elastomer so that effectively 100% sealing can occur between the overcap and the container. The outer portion can generally be made of a thermoplastic elastomer as well. The outer portion can be adhered to the perimeter of the overcap so that it can be at least partially visible to a consumer. Since it is visible to the consumer, the consumer is able to touch the outer portion. Being visible as well as touchable to the consumer means that the consumer can visibly see and touch this thermoplastic elastomer, which communicates and signals to the consumer sealing confidence and thus freshness of the roast and ground coffee insider the packaging system. Therefore, outer portion can provide a simple yet strong visual signal to consumers that the container is one which presents an airtight seal.

To create an airtight seal between the overcap and the container, and thus to allow a vacuum to form when the packaging system 10 is "burped," a thermoplastic elastomer (TPE) is used as a gasket or seal in at least one embodiment. TPE, which is generally known to those skilled in the art as a soft touch material, is used to create a 100%, or nearly 100%, airtight seal between the container and the overcap. When attached to the overcap, the TPE deforms and conforms to the container when the overcap is placed on the container, and this arrangement forms a seal to block air from entering the package system.

Thermoplastic elastomers are used in accordance with multiple embodiments of the present invention. Selection of the correct and best thermoplastic elastomer is based on a number of factors. Among those factors are the ability to effectively seal between the overcap and the container, having the proper friction and structural properties to ride over the container during application of the overcap to the container for closing of the container, and a lack of attraction and detainment of roast and ground coffee grounds. Thus, embodiments of the present invention will be hereinafter described in light of these factors.

FIG. 1 details a packaging system 10 in accordance with one embodiment of the present invention. Packaging system 10 generally comprises a container 11 made from a plastic, for example, polyolefin. Packaging system 10 is in general accordance with those disclosed in U.S. Pat. Nos. 7,169,418 and 7,169,419, which are hereby incorporated by reference herein in their entirety. It should be realized that container 11 can take any number of shapes, non-limiting examples including round, square, parallelepiped, and including with or without handles, grips, or pass-through handles, and can be made of any number of suitable materials. Container 11 generally comprises an open top 12, a closed bottom 13, and a body portion 14. Open top 12, closed bottom 13, and body portion 14 define an inner volume in which a product, such as roast and ground coffee, is contained.

With further reference to FIG. 1, container 11 can be cylindrically shaped with substantially smooth sides. In another embodiment, the container is parallelepiped shaped. Handle portions 15 can be respectively formed in container body portion 14 at arcuate positions. Additionally, container 11 can have a protuberance 17 in the form of a rim like structure disposed at the open end of container 11. Protuberance 17 can provide a surface with which to removably attach a closure 18 and provide a locking surface for skirt portion 32 of overcap 30.

Again referring to FIG. 1, protuberance 17, in the form of a rim like structure, disposed at the open end of container 11 may have textured surfaces disposed thereon. Textured surfaces disposed on protuberance 17 can comprise raised surfaces in the form of protuberances, annular features, and/or cross-hatching to facilitate better sealing of removable closure 19. Annular features may include a single bead or a series of beads as concentric rings protruding from the seal surface of protuberance 17. While not wishing to be bound by theory, it is believed that a textured surface on protuberance 17 can allow for the application of a more uniform and/or concentrated pressure during a sealing process. Textured surfaces can provide increased sealing capability between protuberance 17 and removable closure 19 due to any irregularities introduced during molding, trimming, shipping processes, and the like during manufacture of container 11. It should be understood that while FIG. 1 and other embodiments disclose a protuberance 17, packaging systems without a protuberance are contemplated and within the scope of this invention.

Further in FIG. 1, packaging system 10 can comprise a closure 18. Closure 18 can be a laminated, peelable seal 19 that can be removably attached and sealed to container 11. Peelable seal 19 can have a hole beneath, which can be applied a degassing valve, indicated as a hole by reference number 20. One-way valve 20 can be heat welded or glued to peelable seal 19.

Closure 18 can be sealed to container 11 along a rim or protuberance 17 of container 11. Methods of sealing include a heat sealing method incorporating a hot metal plate applying pressure and heat through the closure material and the container rim, causing a fused bond. The peel strength achieved is generally a result of the applied pressure, temperature, and dwell time of the sealing process. However, it should be known to one skilled in the art that other types of seals and seal methods could be used to achieve a bond with sufficient and effective seal strength, including, but not limited to, a plurality of annular sealing beads disposed on rim 17.

Referring again to FIG. 1, packaging system 10 can comprise an overcap 30. Overcap 30 can comprise a dome portion 31, skirt portion 32, and rib 33. Overcap 30 can be configured to be removably attached to container 11. As a non-limiting example, overcap 30 is generally manufactured from a plastic with a low flexural modulus, for example, linear low-density polyethylene (LLDPE), low-density polyethylene (LDPE), high-density polyethylene (HDPE), polyethylene (PE), polypropylene (PP), linear low-density polyethylene (LLDPE), polycarbonate, polyethylene terephthalate (PET), polystyrene, polyvinyl chloride (PVC), co-polymers thereof, and combinations thereof. This allows for an overcap 30 that has a high degree of flexibility yet can still provide sufficient rigidity to allow stacking of successive containers. By using a flexible overcap 30, mechanical application during packaging as well as re-application of overcap 30 to container 11 after opening by the consumer is facilitated. A feature of a flexible overcap 30, especially a flexible overcap 30 made from a plastic selected from above, although no exclusively, is the ability of the end user to "burp" excess atmospheric gas from container 11 thereby reducing the amount of oxygen present inside the container 11. Additionally, the desired balance of flexibility and rigidity exhibited by overcap 30 is to vary the thickness profile of the overcap 30. For example, the dome portion 31 can be manufactured to be thinner than skirt portion 32 and rib 33.

Dome portion 31 can generally be designed with a curvature, and hence height, to accommodate for an outward displacement of closure 18 from container 11 as a packaged product, such as roast and ground coffee, off gases. The amount of curvature needed in dome portion 31 can be mathematically determined as a prediction of displacement of closure 18. As a non-limiting example, a nominal height of dome portion 31 can be 0.242 inches (0.61 cm) with an internal pressure on closure 18 of 15 millibars for a nominal 6-inch (15.25 cm) diameter overcap. Further, the dome portion 31 can also generally displaceable beyond its original height as internal pressure rises in container 11, causing closure 18 to rise prior to the release of any off gas by a one-way valve 20. While dome portion 31 has been described as designed with a curvature, other embodiments are envisioned that do not have a curvature. A simple flat design may also be appropriate.

Figure 2:
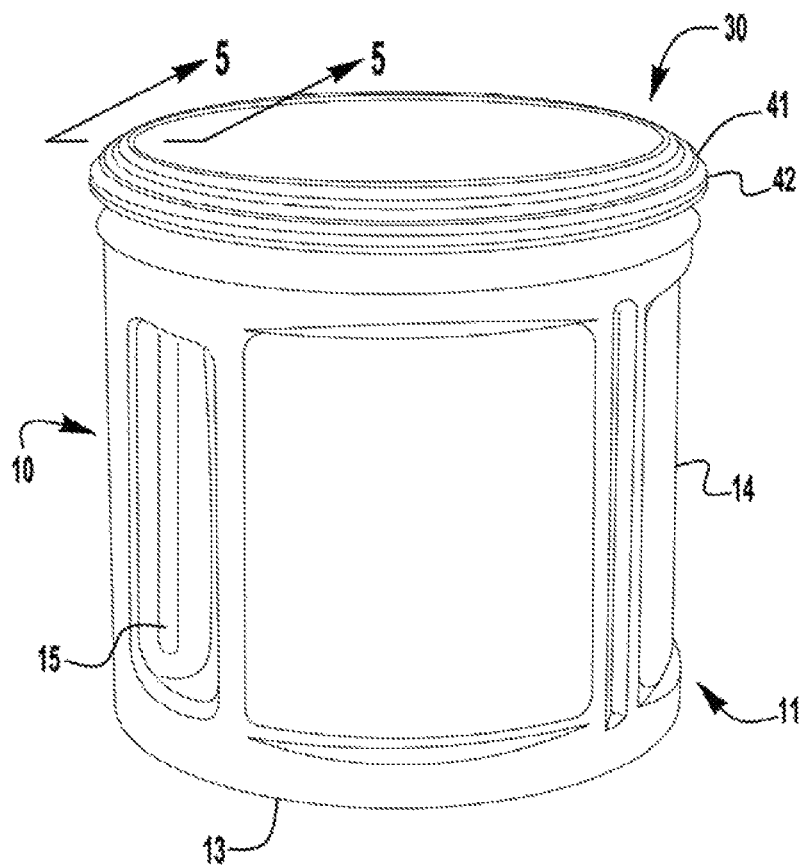
FIG. 2 is a perspective view of the packaging system including an overcap with an outer portion.

FIG. 2 shows a perspective view of packaging system 10 in accordance with one embodiment of the present invention. In this embodiment, packaging system 10 includes a container 11 comprising a closed bottom 13, body portion 14, and handle portions 15. FIG. 2 further details an overcap 30 applied to the container 11, collar 41 of the overcap, and an outer portion 42 of the overcap. Outer portion 42, in this particular embodiment, is adhered to the perimeter of the overcap 30 at collar 41 and has a first portion for adhering to the overcap (not shown in this figure but shown in FIG. 4) and a second portion for visual and touching stimulus to an end user, as hereinbefore described.

Figure 3:
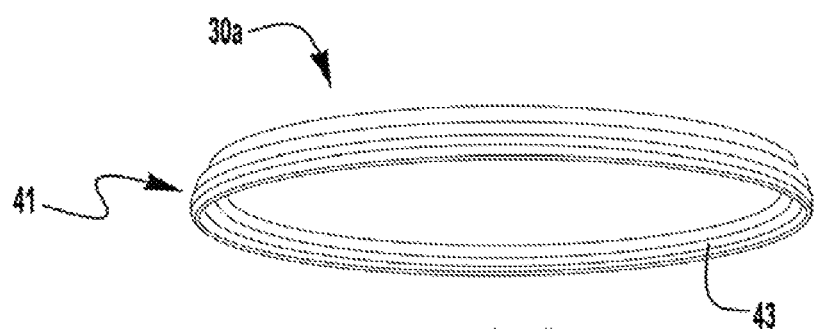
FIG. 3 is a perspective view of the overcap including a gasket.

FIG. 3 details a perspective view of a partial view of the side and underside of an overcap 30a in accordance with one embodiment of the present invention. In this embodiment, overcap 30a has a collar 41. Gasket 43 is further shown on the underside of the overcap 30a. Gasket 43 is situated on the interior of overcap 30a. Gasket 43 is for sealing between the overcap 30a and the container 11. It can form a 100% airtight, or nearly airtight, seal between the overcap 30a and the container 11 so that air cannot enter the container. As described before, the gasket can be made from a thermoplastic elastomer (TPE). TPE, which is generally known to those skilled in the art as a soft touch material, is used to create a 100%, or nearly 100%, airtight seal between the container and the overcap. When attached to the overcap, the TPE deforms and conforms to the container when the overcap is placed on the container, and this arrangement forms a seal to block air from entering the package system.

Figure 4:
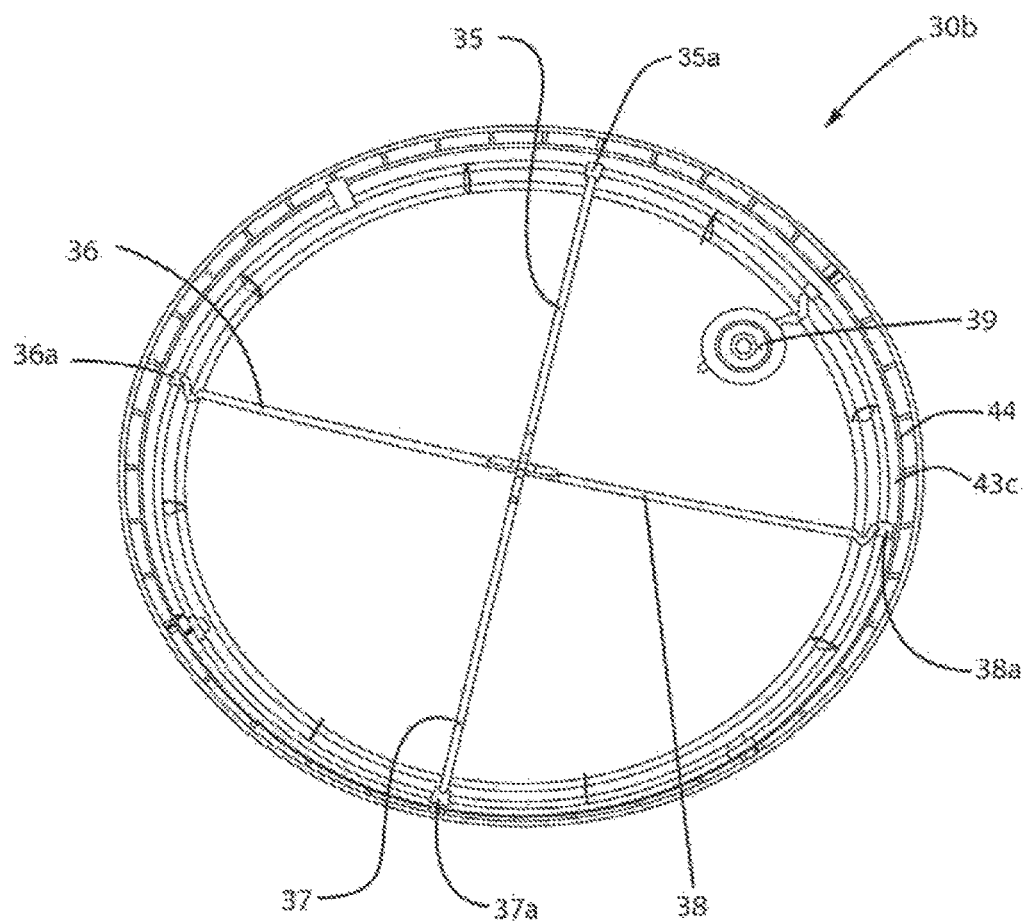
FIG. 4 is a perspective view of the underside of the overcap.

FIG. 4 details a perspective view of the underside of one embodiment of the overcap 30b. In this embodiment, overcap 30b includes a visual indicator 39, in the form of a bubble that is concave outwardly away from the inside of the container or concave inwardly towards the inside of the container, depending on whether a vacuum exists inside the packaging system. It indicates a pressure differential between the inside of the container and the outside of the container after the container has been "burped" by a consumer. When the packaging system is under vacuum, the visual indicator 39 is inwardly concave. When the packaging system is not under vacuum, the visual indicator 39 is outwardly concave. One embodiment of a gasket 43c is also shown. In this embodiment, gasket 43c is formed from four runner spokes 35, 36, 37, and 38. These runner spokes 35, 36, 37, and 38 represent areas in which an injection molding core is inserting the thermoplastic material to form the gasket 43c. Thus, at the points where the runner spokes touch the perimeter of the overcap, such as at points 35a, 36a, 37a, and 38a, no middle portion, which is explained subsequently, is present. Thus, the middle portion is not contiguously disposed around the perimeter of the overcap in this embodiment since the four runner spokes touch the perimeter of the overcap 30b at the points 35a, 36a, 37a, and 38a. As shown in FIG. 16, overcap 30d includes a middle portion 44 that is discontinuous and takes the form of at least four discontinuous arc pieces 44a, 44b, 44c, and 44d disposed around the perimeter of the overcap due to the four gaps created at end points 35a, 36a, 37a, and 38a of spokes 35, 36, 37, and 38.

Figure 5:
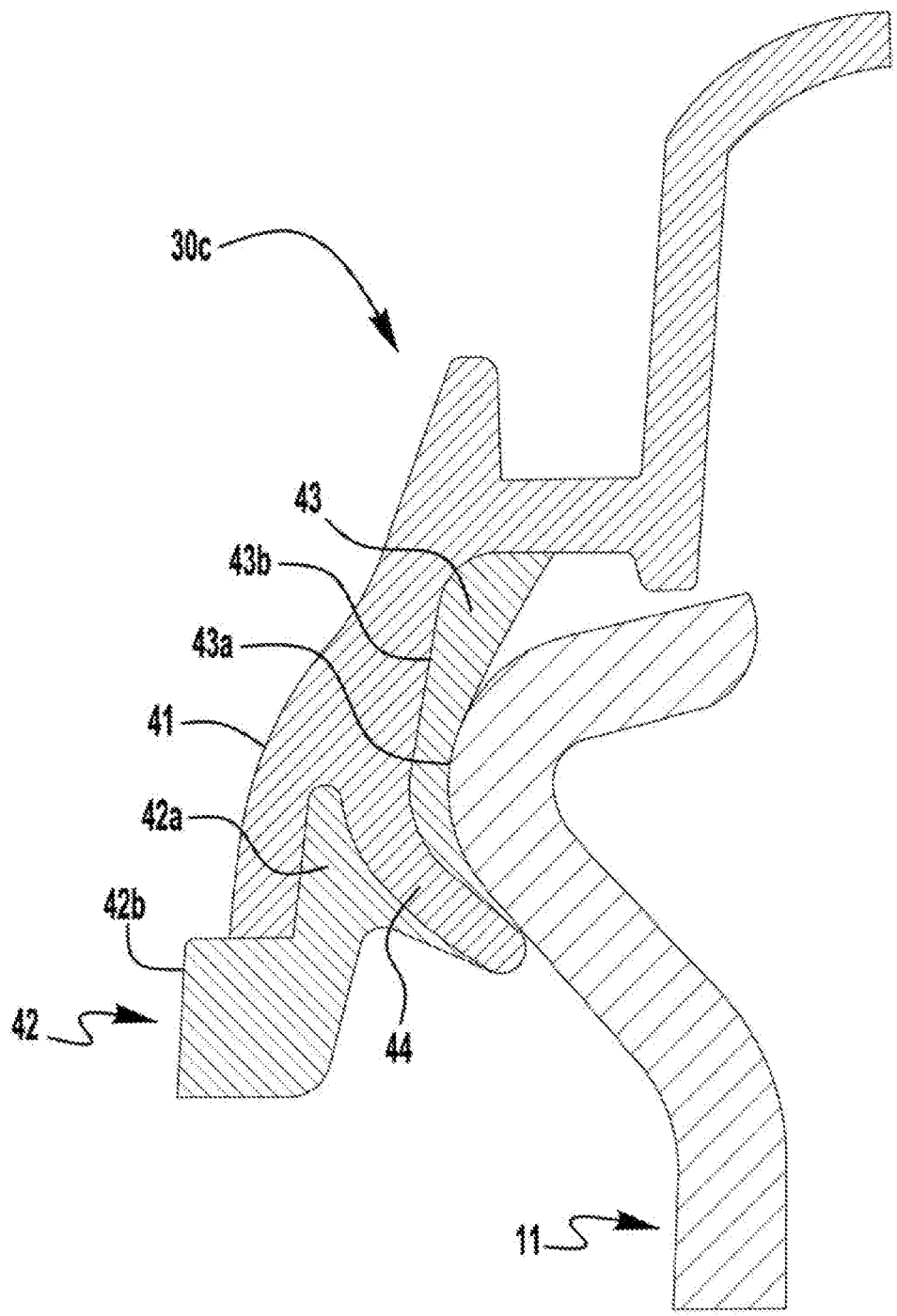
FIG. 5 is a close up view of the container with an applied overcap.
Figure 6:
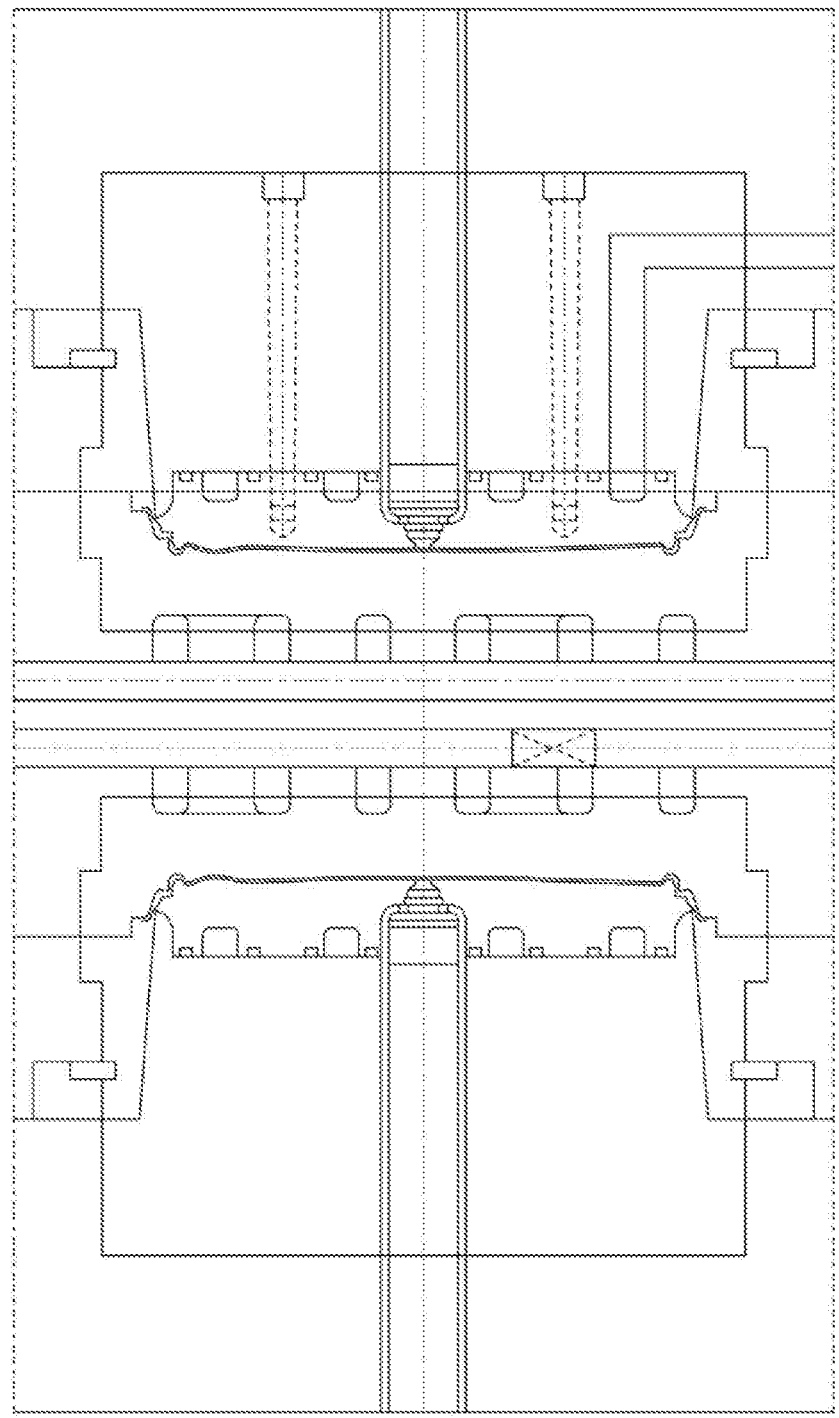
FIG. 6 is a mold sequence for a first step of the manufacturing process associated with at least one embodiment of the present invention.
Figure 7:
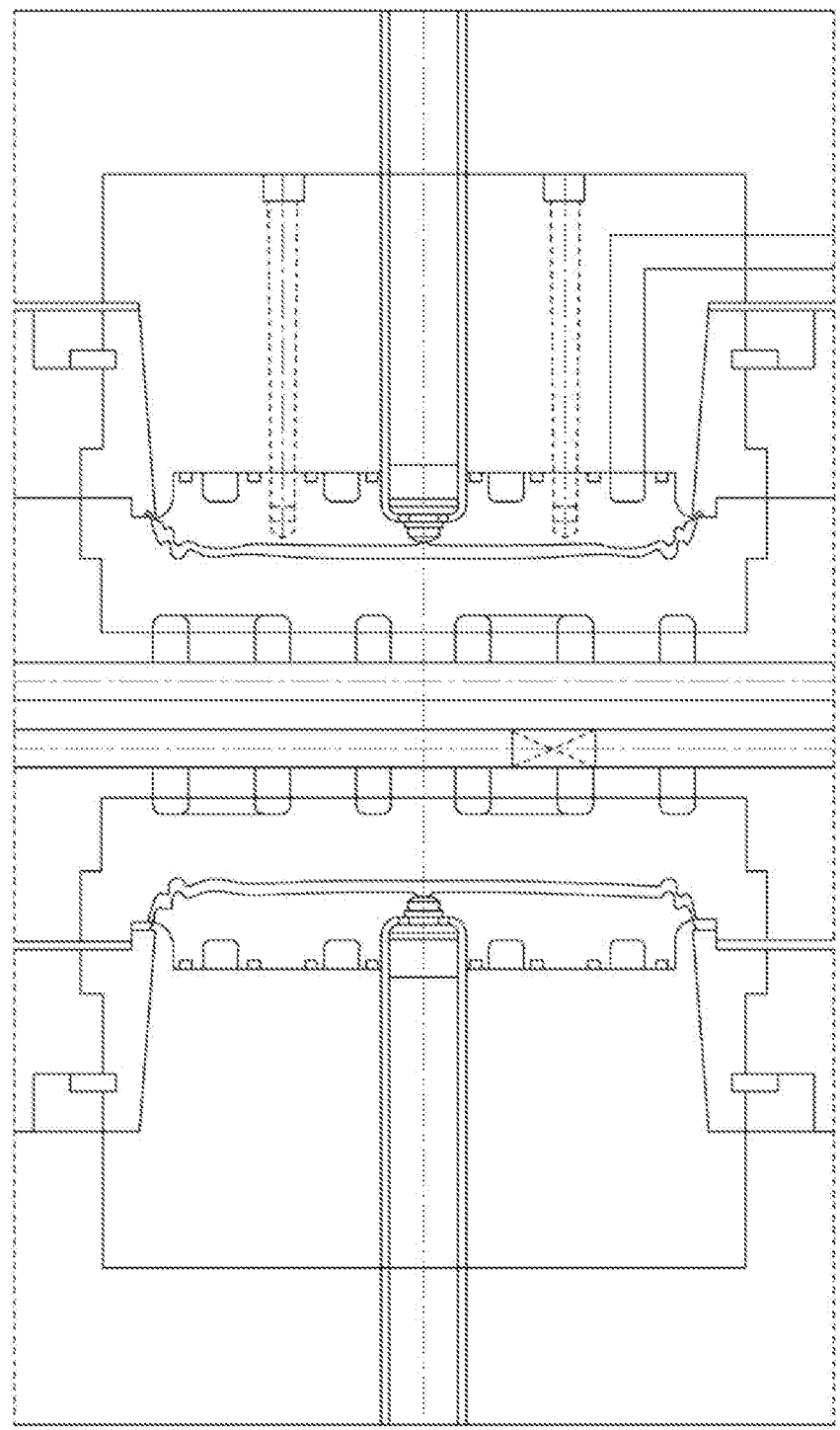
FIG. 7 is a mold sequence for a subsequent step of the manufacturing process associated with at least one embodiment of the present invention.
Figure 8:
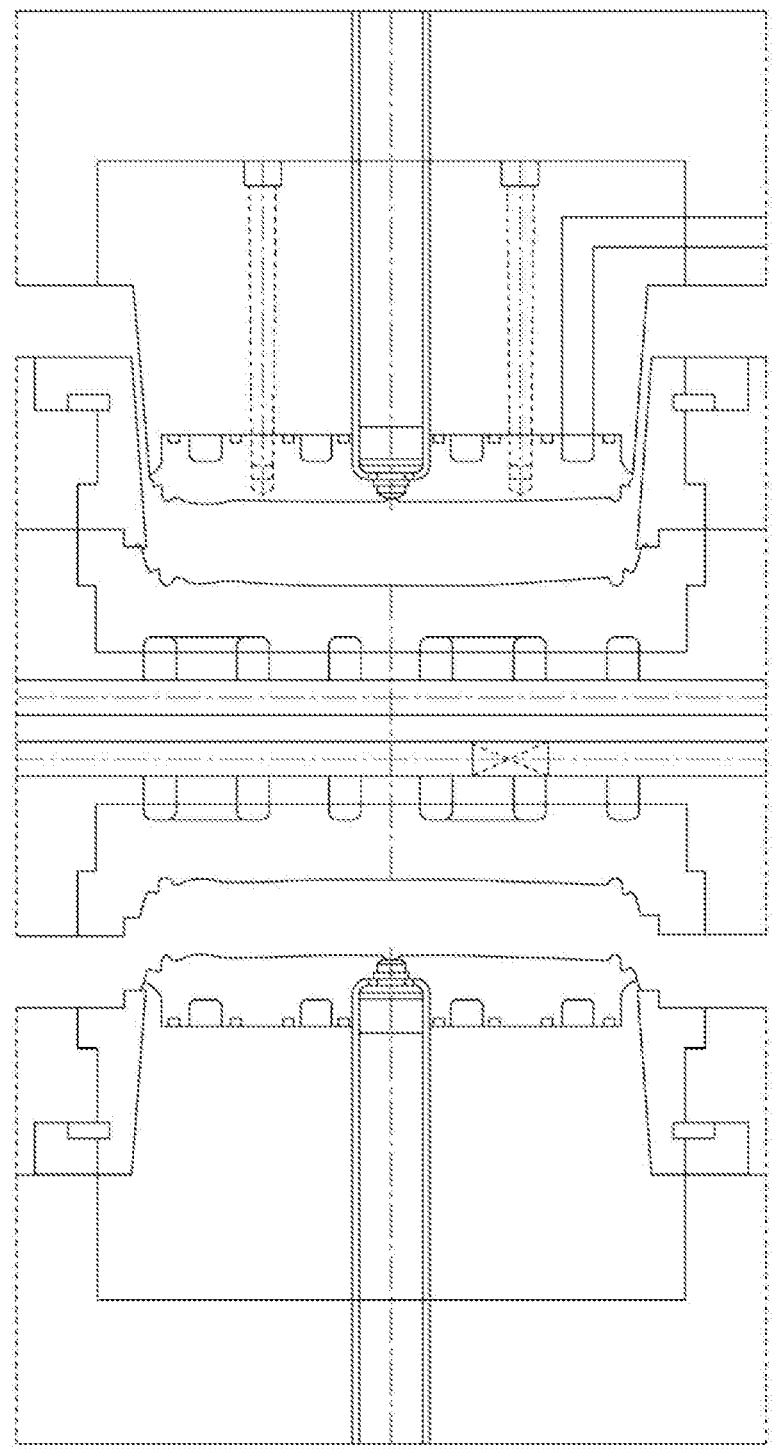
FIG. 8 is a mold sequence for a subsequent step of the manufacturing process associated with at least one embodiment of the present invention.
Figure 9:
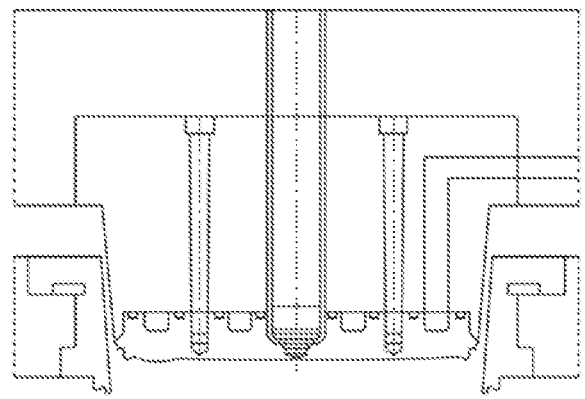
FIG. 9 is a mold sequence for a subsequent step of the manufacturing process associated with at least one embodiment of the present invention.
Figure 9:
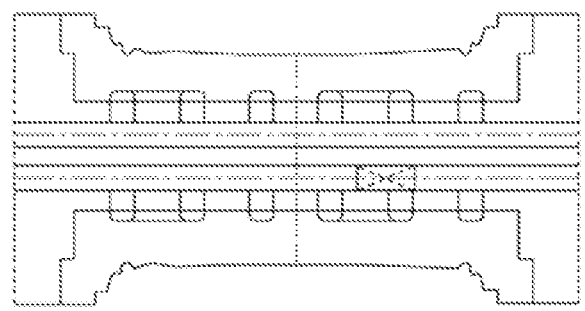
Figure 9:
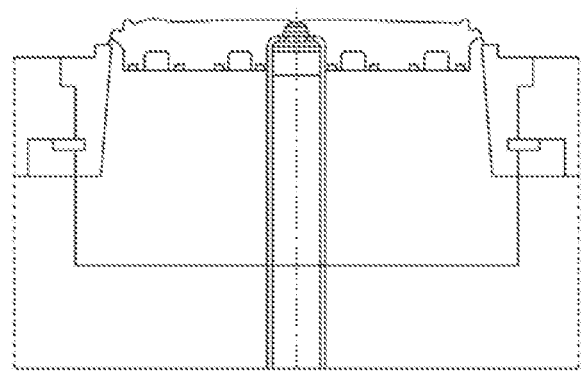
Figure 10:
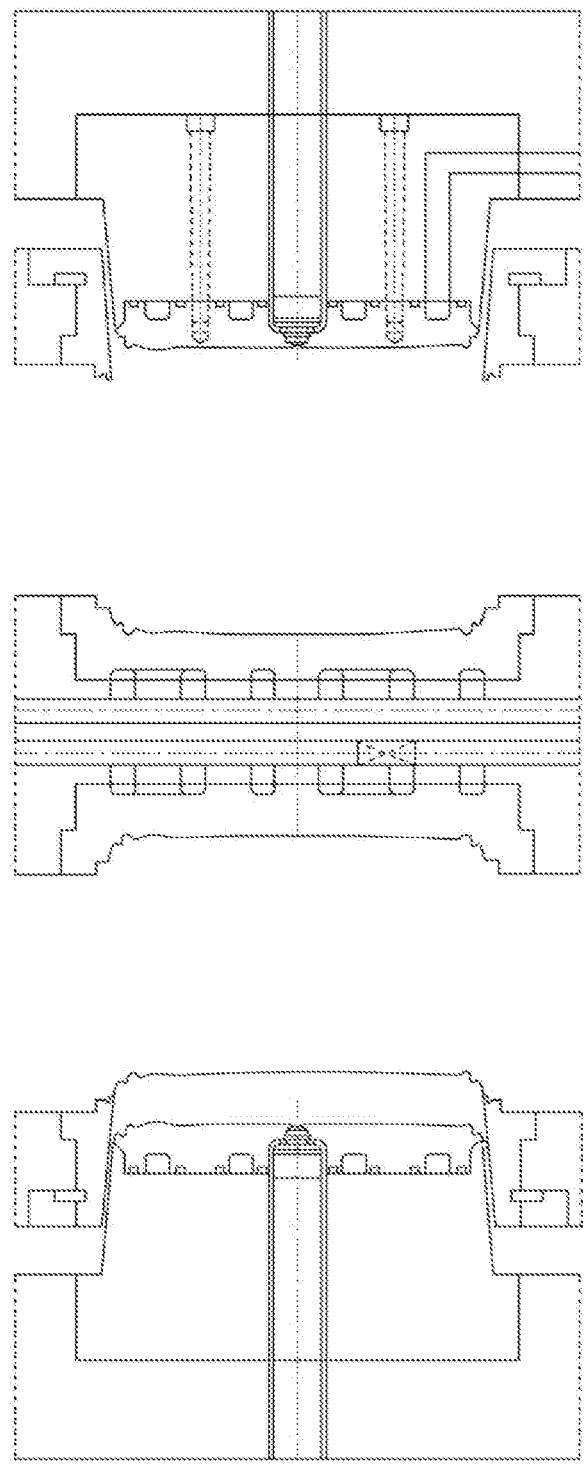
FIG. 10 is a mold sequence for a subsequent step of the manufacturing process associated with at least one embodiment of the present invention.
Figure 11:
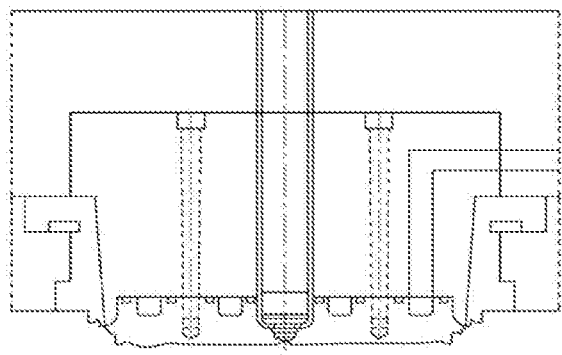
FIG. 11 is a mold sequence for a subsequent step of the manufacturing process associated with at least one embodiment of the present invention.
Figure 11:
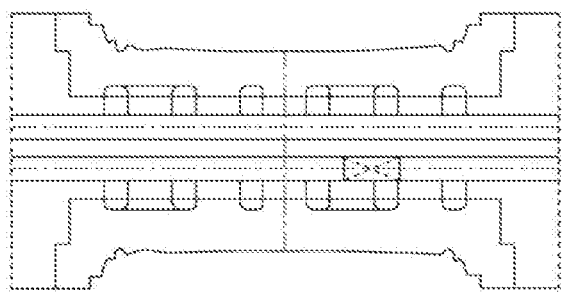
Figure 11:
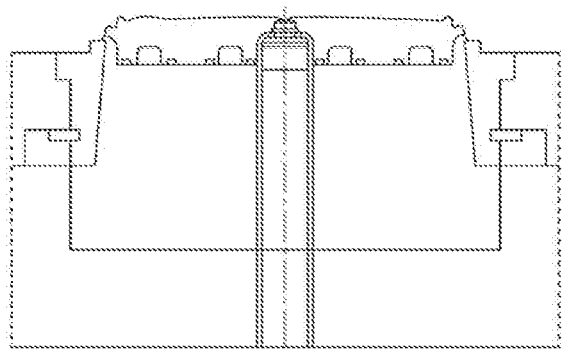
Figure 12:
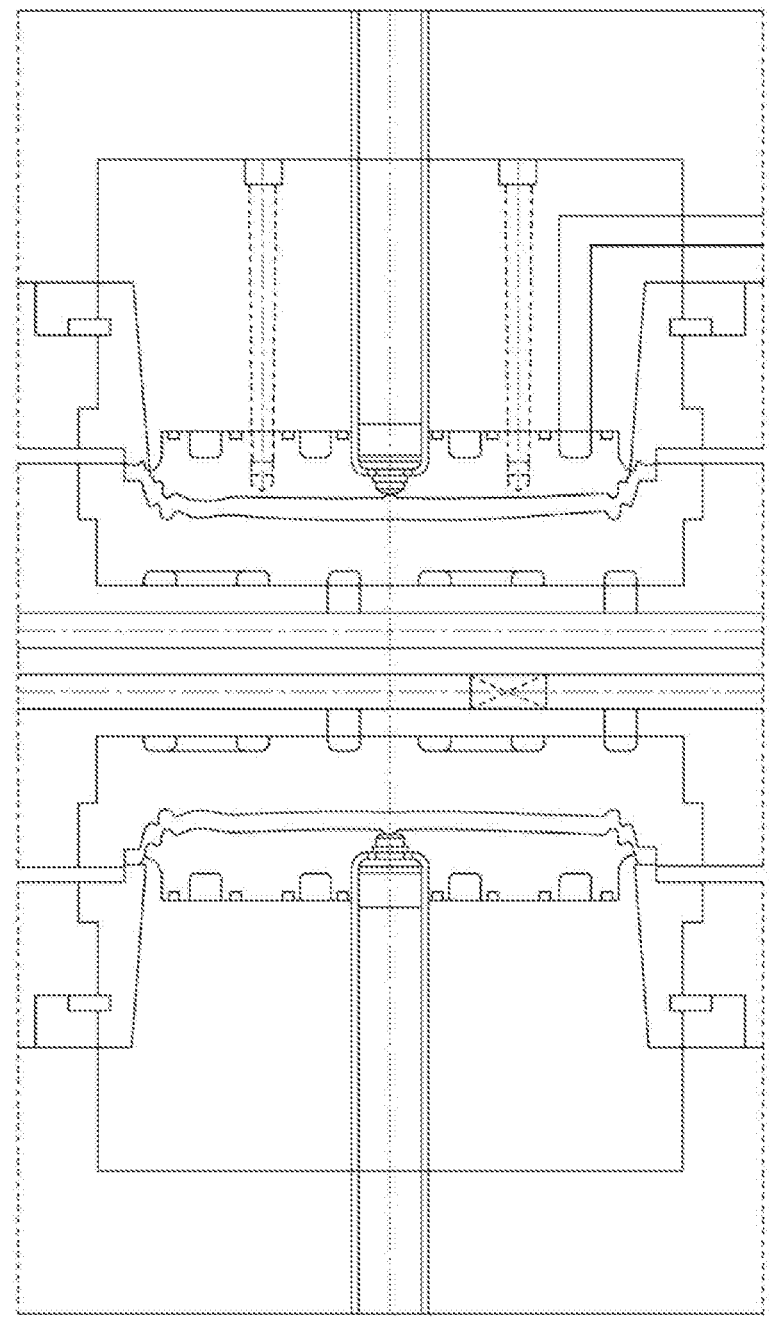
FIG. 12 is a mold sequence for a subsequent step of the manufacturing process associated with at least one embodiment of the present invention.
Figure 13:
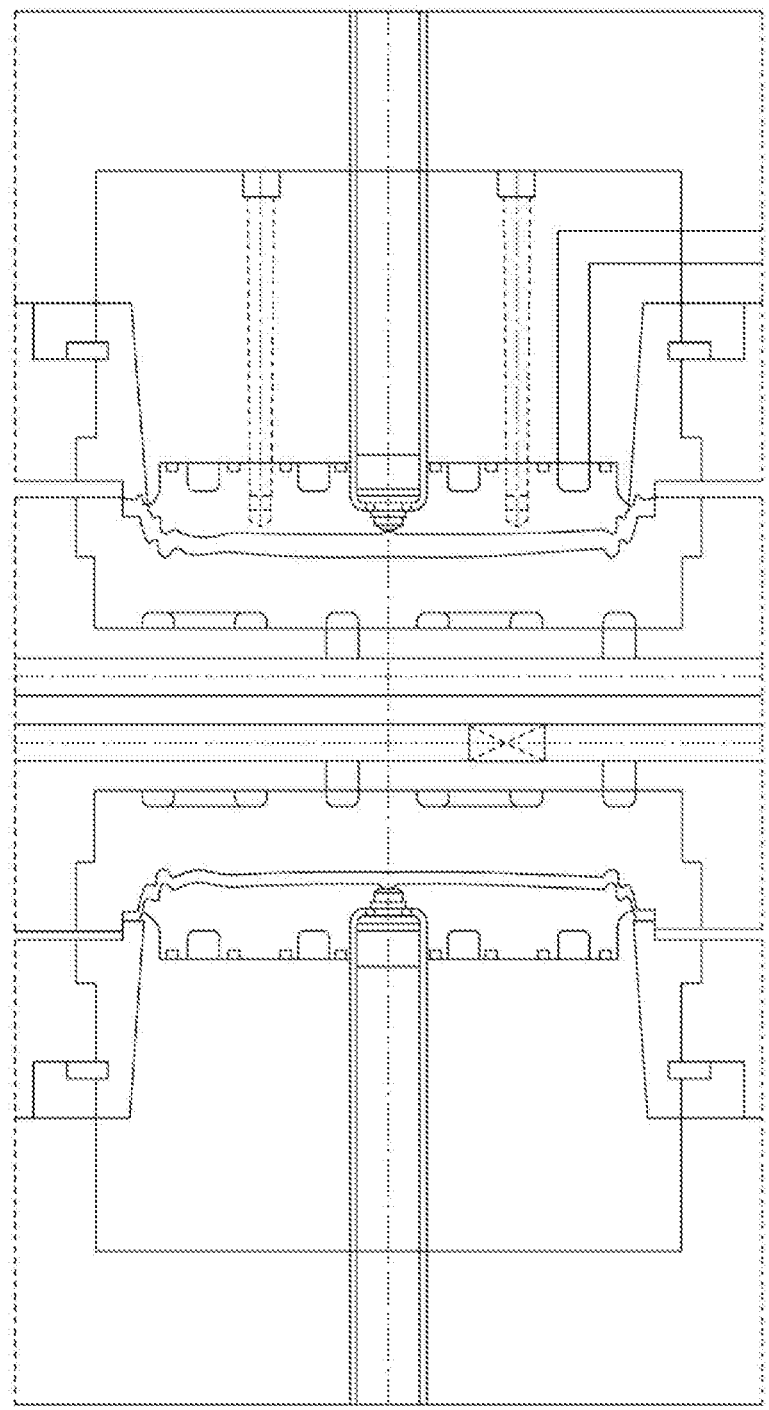
FIG. 13 is a mold sequence for a subsequent step of the manufacturing process associated with at least one embodiment of the present invention.
Figure 14:
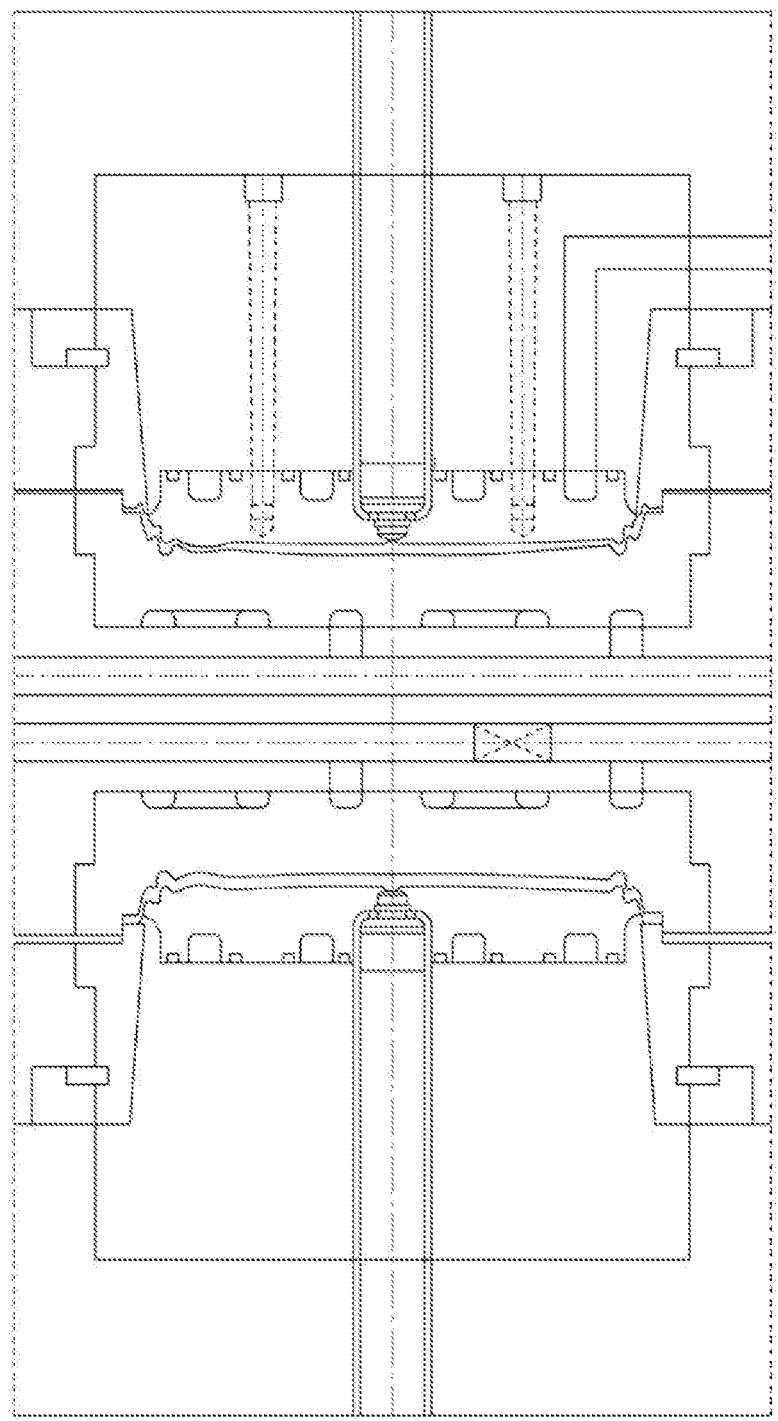
FIG. 14 is a mold sequence for a subsequent step of the manufacturing process associated with at least one embodiment of the present invention.
Figure 15:
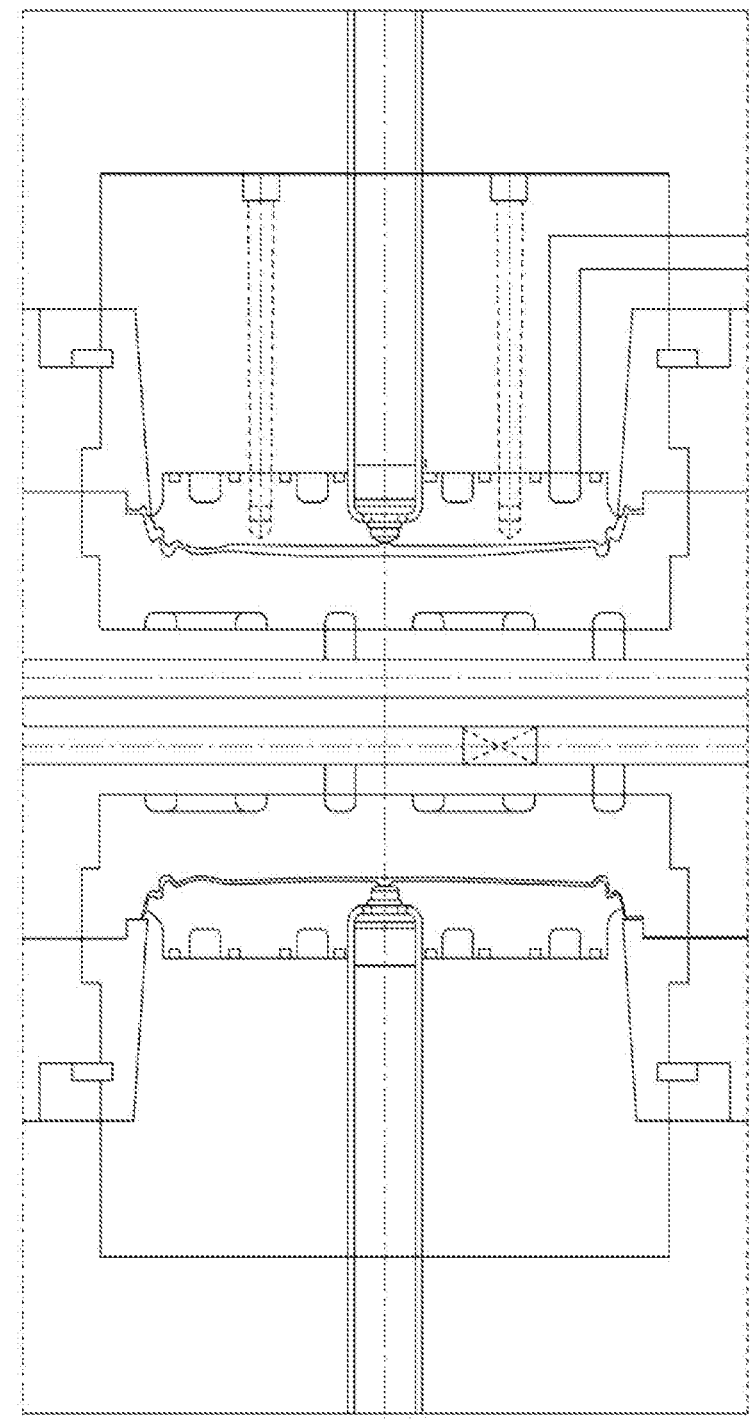
FIG. 15 is a mold sequence for a subsequent step of the manufacturing process associated with at least one embodiment of the present invention.

FIG. 5 details a close up view of one embodiment of an overcap 30c attached to a container 11. In this embodiment, overcap 30c includes a collar 41. Collar 41 includes a middle portion 44. In this embodiment, a gasket 43 is included and adhered to the underside of the overcap 30c. Gasket 43 includes a first surface 43a and a second surface 43b. Also in this embodiment, an outer portion 42 is included and adhered to the overcap 30c. Outer visual portion 42 includes a first portion 42a and a second portion 42b.

Middle portion 44 in FIG. 5 is part of the collar 41 and is positioned to separate the gasket 43 and the outer portion 42 so that physical contact between the gasket 43 and outer portion 42 does not take place. However, physical contact could take place in other embodiments that are within the scope of this invention. Furthermore, middle portion 44 is situated so that it does make physical contact with the container 11 upon application of the overcap 30c to the container 11. Upon application of the overcap 30c to the container 11, a clicking sound or snapping sound is produced, which is the physical contacting of the middle portion 44 with the container 11. Such an audible clicking or snapping sound is perceived by the end user such that it gives them confidence that indeed the overcap 30c has been properly applied to container 11 such that it has been applied and sealed to the container well enough to create an airtight, or nearly airtight seal.

In FIG. 5, gasket 43 comprises a first surface 43a and a second surface 43b. First surface 43a can be for sealing to the container to prevent air from entering the container. Second surface 43b can be for adhering the gasket 43 to the overcap 30c. As shown in FIG. 5, first surface 43a and second surface 43b can be integral with gasket 43 such that all three are one piece.

Outer visual portion 42 can also be included. It can comprise a first portion 42a and a second portion 42b. First portion 42a can be for adhering to the overcap. Second portion 42b can be for visual and touching stimulus to an end user. As shown in FIG. 5, first portion 42a and second portion 42b can be integral such that they together form one piece as outer portion 42.

Other embodiments of the present invention are also included within the scope of this invention. For example, coloring of the gasket, the outer portion, the collar, and the middle portion is contemplated. Such coloring would include differing colors such that the outer portion and the gasket are of the same color but of different color than the collar and middle portion. Further, the outer portion and the gasket could be of differing colors while the outer portion, the collar, and the middle portion are of differing colors as well. Differing colors between the collar and the outer portion allows an end user to visually notice that a distinguishing characteristic is present, that of a different material adhered to the overcap in the form of the outer portion.

As discussed above, the outer portion and gasket are generally made of elastic polymers, which include rubbers and thermoplastic elastomers. Preferably, thermoplastic elastomers are used for the outer portion and the gasket. Thermoplastic elastomers provide a soft touch material that also allows for an airtight seal. Further, the overcap, including the collar and middle portion, is generally made of rigid plastic materials, such as polyolefins. The overcap can be made of polypropylene. It should be understood that other similar types of plastics are within the scope of this invention and can be used to make the components of the packaging system.

In other embodiments, the TPE material can be at least partially, or completely, translucent such that it can be used to create a color changing seal. In these embodiments, when intimate contact between the container and overcap exists, the seal at the interface between the container and the overcap can change colors. In one embodiment, for example, wherein the TPE material is blue, and the container portion touching the TPE material is yellow, the seal can turn to a resulting green color. Other color arrangements can be envisioned using any colors for the TPE material and the container such that any resulting color can be formed.

In usage of the overcap, during "burping" of the packaging system 10, the end user or consumer pushes on the top of overcap 30 of the packaging system 10 to force air out of the container 11 and then subsequently seals or pressed on the overcap 30 to the container 11 so that a slight vacuum is maintained within the packaging system 10 over time. Upon the performance of "burping" by the consumer, he or she then knows that they have removed at least some air, and thus oxygen, from the container and thus have prepared a friendlier environment for the coffee. Since some oxygen has been removed from the container, and oxygen is prevented by the airtight gasket from entering into the container, less oxidizing of the coffee will occur and thus a fresher coffee will be maintained. The gasket 43 gives to the consumer the benefit of knowing that an airtight, or nearly airtight, seal has been made.

With respect to manufacturing, container 11, as shown in FIG. 1, can be produced by blow molding a polyolefinic compound. Polyethylene and polypropylene, for example, are relative low cost resins suitable for food contact and provide an excellent water vapor barrier. However, it is known in the art that these materials are not well suited for packaging oxygen-sensitive foods requiring a long shelf life. As a non-limiting example, ethylene vinyl alcohol (EVOH) can provide such an excellent barrier. Thus, a thin layer of EVOH sandwiched between two or more polyolefinic layers can solve this problem. Therefore, the blow-molding process can be used with multi-layered structures by incorporating additional extruders for each resin used. Additionally, the container can be manufactured using other methods, including injection molding and stretch blow molding.

Overcap 30 with gasket 43 and outer portion 42 can be manufactured using injection molding. In at least one embodiment of manufacture, the mold design uses a rotating tube stack mold configuration. FIGS. 6-15 detail a molding process that can be used to manufacture an overcap in accordance with at least one embodiment of the present invention.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An overcap comprising a dome portion, a skirt portion, and a perimeter for sealing a container, wherein the container has an open end with a protuberance in a form of a rim structure disposed at the open end, wherein the protuberance provides a concentric ring locking surface for the skirt portion of the overcap, wherein:
   a) the dome portion of the overcap is manufactured from rigid plastic material;
   b) the skirt portion of the overcap comprises:
      (i) a collar;
      (ii) a middle portion protruding inward from the collar;
      (iii) a gasket for sealing between the collar and the container, wherein the gasket comprises a first surface for sealing to the concentric ring locking surface of the protuberance of the container and a second surface for adhering to the collar; and
      (iv) an outer portion adhered to the collar, wherein the outer portion comprises:
         (a) a first portion for adhering to the collar; and
         (b) a second portion as a lower terminal of the overcap for visual and touching stimulus to an end user;
   wherein the middle portion separates the gasket and the outer portion such that the gasket does not physically contact the outer portion, and the outer portion does not physically contact the container;
   wherein the middle portion physically contacts the container such that a clicking sound is produced when the overcap is snapped onto the container; and
   wherein the first portion is positioned between the middle portion and the collar.

2. The overcap of claim 1, and wherein the gasket is adhered to the collar.

3. The overcap of claim 1, and wherein the outer portion and the middle portion are of different colors.

4. The overcap of claim 1, and wherein the collar and the outer portion are of different colors.

5. The overcap of claim 1, and wherein the gasket is made from a thermoplastic elastomer.

6. The overcap of claim 1, and wherein the outer portion is made from a thermoplastic elastomer.

7. The overcap of claim 1, and wherein the dome portion and collar are made from polypropylene.

8. The overcap of claim 1, further comprising a visual indicator, wherein, when the overcap seals the container, an inside space is formed within the container, and the visual indicator indicates a pressure differential between the inside space of the container and the space outside the container.

9. The overcap of claim 1, and wherein the outer portion and the gasket are made from a thermoplastic elastomer.

10. The overcap of claim 1, and wherein the overcap seals a container of roast and ground coffee.

11. An overcap comprising a dome portion, a skirt portion, and a perimeter for sealing a container, wherein the container has an open end with a protuberance in a form of a rim structure disposed at the open end, wherein the protuberance provides a concentric ring locking surface for the skirt portion of the overcap, wherein:

a) the dome portion of the overcap is manufactured from rigid plastic material;

b) the skirt portion of the overcap comprises:

(i) a collar;

(ii) a middle portion protruding inward from the collar;

(iii) a gasket for sealing between the collar and the container, wherein the gasket comprises a first surface for sealing to the concentric ring locking surface of the protuberance of the container and a second surface for adhering to the collar; and (iv) an outer portion adhered to the collar, wherein the outer portion comprises:

(a) a first portion for adhering to the collar; and (b) a second portion as a lower terminal of the overcap for visual and touching stimulus to an end user, wherein the middle portion separates the gasket and the outer portion such that the gasket does not physically contact the outer portion, and the outer portion does not physically contact the container, wherein the middle portion physically contacts the container such that a clicking sound is produced when the overcap is snapped onto the container, and wherein the overcap comprises a plurality of runner spokes radiating outwardly from a center of the overcap towards the perimeter of the overcap and wherein no middle portion is present where the runner spokes touch the perimeter of the overcap.

12. The overcap of claim 11, and wherein the discontinuous middle portion is composed of at least four individual arc portions separated by individual breaks therein, the individual breaks being located at each point where each of the plurality of runner spokes touch the perimeter of the overcap.

* * * * *